No. 756,700. PATENTED APR. 5, 1904.
O. A. POIRIER.
BEARING FOR DISK DRILLS.
APPLICATION FILED JAN. 19, 1904.
NO MODEL. 2 SHEETS—SHEET 1.

WITNESSES
INVENTOR
OCTAVE A. POIRIER
BY
HIS ATTORNEYS

No. 756,700. PATENTED APR. 5, 1904.
O. A. POIRIER.
BEARING FOR DISK DRILLS.
APPLICATION FILED JAN. 19, 1904.
NO MODEL. 2 SHEETS—SHEET 2.
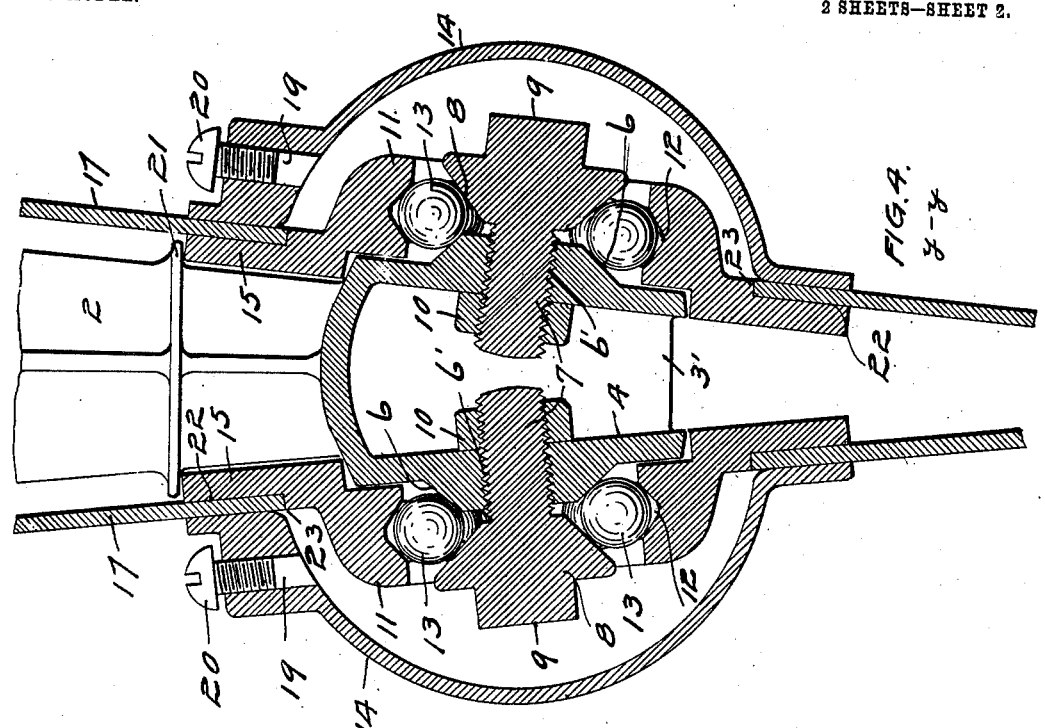
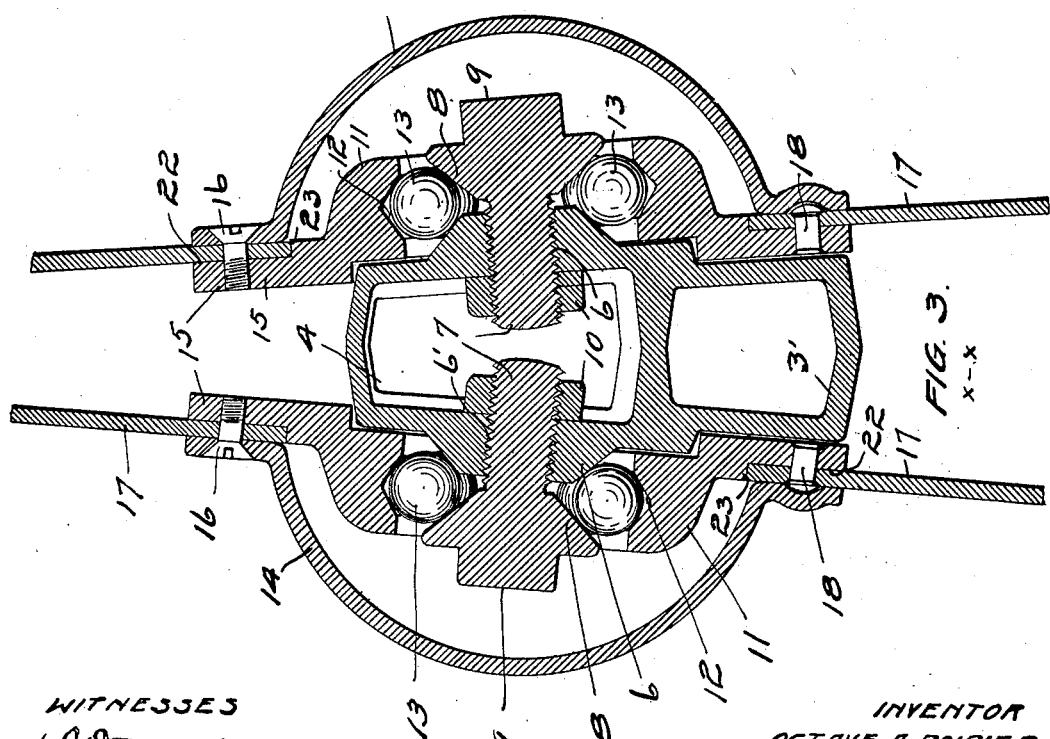
WITNESSES
INVENTOR
OCTAVE A. POIRIER
BY
HIS ATTORNEYS No. 756,700. Patented April 5, 1904.

UNITED STATES PATENT OFFICE.

OCTAVE A. POIRIER, OF GLADSTONE, MINNESOTA.

BEARING FOR DISK DRILLS.

SPECIFICATION forming part of Letters Patent No. 756,700, dated April 5, 1904.

Application filed January 19, 1904. Serial No. 189,694. (No model.)

*To all whom it may concern:*

Be it known that I, OCTAVE A. POIRIER, of Gladstone, Ramsey county, Minnesota, have invented certain new and useful Improvements in Bearings for Disk Drills, of which the following is a specification.

The object of my invention is to provide a bearing primarily designed for double-disk drills, though adapted for use with single-disk drills as well, which will be comparatively inexpensive to manufacture, easy running, and practically dust-proof.

A further object is to provide a ball-bearing having a movable cone that is easily accessible for the purpose of adjustment or removal.

Other objects of the invention will appear from the following detailed description.

The invention consists generally in various constructions and combinations, all as hereinafter described, and particularly pointed out in the claims.

Figure 1:
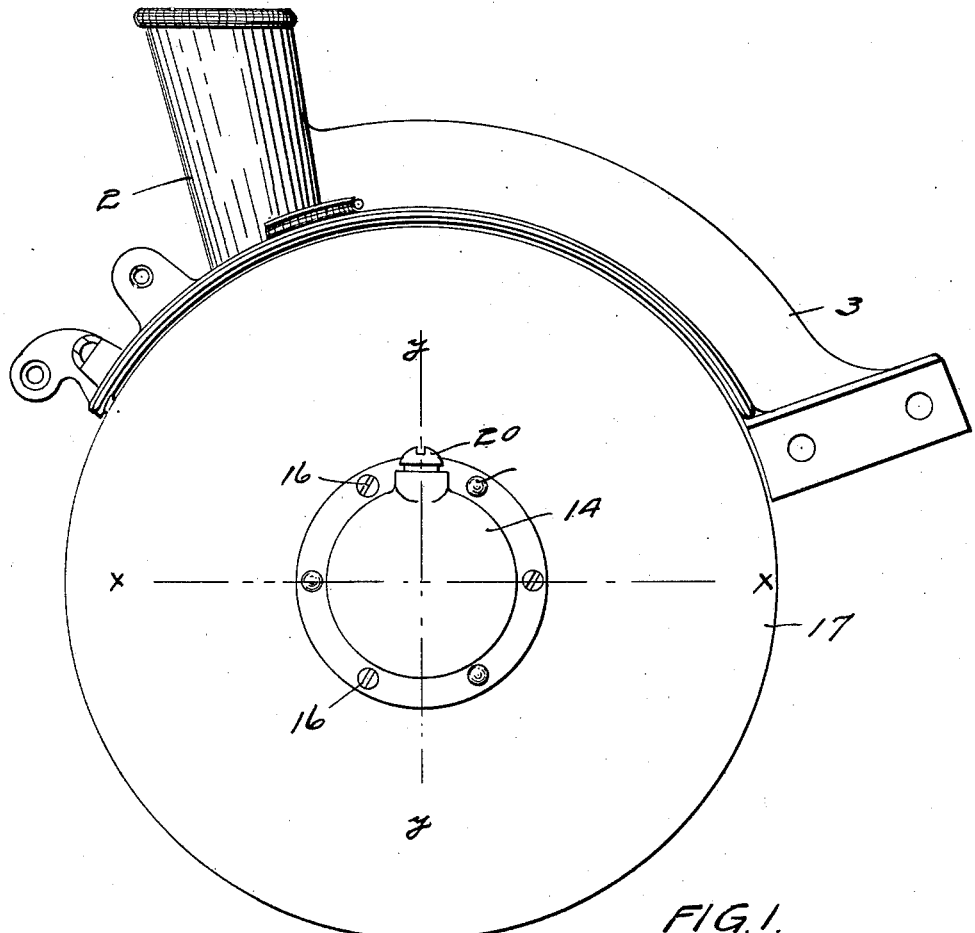
Figure 2:
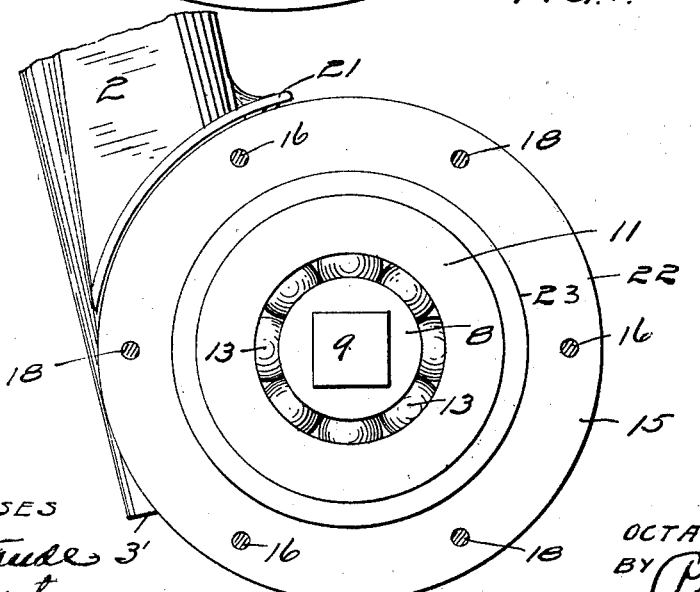

In the accompanying drawings, forming part of this specification, Figure 1 is a side elevation of a drill boot and disk with my invention applied thereto. Fig. 2 is a similar view with the cap or cover of the bearings removed. Fig. 3 is a section on the line $x\,x$ of Fig. 1. Fig. 4 is a section on the line $y\,y$ of Fig. 1.

In the drawings, 2 represents a drill-boot, the upper portion being of ordinary construction, having a shank 3, to which the draft connections are attached, and the depending spout portion 3′, through which the grain is discharged from the hopper. On the forward side of this spout, at its lower end and preferably integral therewith, is a chamber 4, the side walls of which converge toward the front to allow the disks to be set at the proper angle and are provided with fixed cones 6, preferably integral, having threaded holes 6′ to receive threaded shanks 7 of movable cones 8, which have squared outer ends 9 to receive a wrench for the purpose of adjustment or removal. Lock-nuts 10 are provided on the inner ends of the shanks 7 within the chamber 4, by means of which the movable cones can be adjusted toward or from the fixed cones, as desired. The chamber 4 is preferably open at the bottom to allow a wrench to be conveniently inserted for the purpose of operating the lock-nuts.

11 represents hubs provided on each side of the chamber 4, having internal annular grooves 12, that form runways for the balls 13, arranged between said hubs and the fixed and movable cones. Caps 14 are preferably provided for each bearing, fitting over the cones and hubs and effectually concealing and protecting the same from dust and dirt, and these caps are secured to the flanges 15 on said hubs by any suitable means, as by screws 16, which also pass through the drill-disks 17, that are preferably inserted and secured between the caps 14 and the said flanges 15. At suitable intervals between the screws 16 or other securing means I may provide additional fastening devices for the drill-disks, such as rivets 18. Each cap is preferably provided with an oil-supply hole 19, that is normally closed by a screw 20 or other suitable device, and sand-bands 21 are provided on each side of the boot above the bearings to prevent dust and dirt falling or working down therein.

The flanges 15 are provided in their outer surface with annular recesses 22, forming shoulders 23 between the drill-disks and the hubs. These shoulders form rigid substantial bearing-surfaces for the drill-disks and prevent racking and twisting of the same and all danger of shearing or cutting off the rivets and bolts through any sudden shock or strain to which the drill-disks may be subjected.

I claim as my invention—

1. The combination, with a drill-boot, of fixed and movable cones supported thereon, a hub having a ball-bearing on said cones, a drill-disk, and means covering said bearing and between which and said hub said drill-disk is secured.

2. The combination, with a drill-boot, of fixed and movable cones, a flanged hub having a ball-bearing on said cones, a drill-disk, and means covering said bearing and between which and said flange said drill-disk is secured.

3. The combination, with a drill-boot, of fixed and movable cones thereon, a hub having a ball-bearing on said cones, a sand-band, a drill-disk, and a cap covering said cones.

4. The combination, with a drill-boot spout provided with a chamber having a fixed cone in its side wall, of a movable cone having a shank mounted in the wall of said chamber and adjustable toward and from said fixed cone, a hub inclosing said cones and having a runway, balls for said runway, a drill-disk, and a cap covering said cones and hub.

5. The combination, with a drill-boot having fixed cones on its opposite sides, of movable cones supported on said boot and adjustable toward and from said fixed cones, hubs having ball-runways inclosing said cones, balls provided in said runways, and drill-disks mounted on said hubs.

6. The combination, with a drill-boot having a fixed cone, of a movable cone having a threaded shank fitting within a threaded opening in said fixed cone and provided with an adjusting-nut at its inner end, a hub inclosing said cones and movable independently thereof, balls provided between said cones and hub, and a drill-disk mounted on said hub.

7. The combination, with a drill-boot spout having a chamber provided with a fixed cone in its side wall, of a movable cone provided at its inner end with a threaded shank fitting a corresponding opening in the wall of said boot and adjustable toward or from said fixed cone, a hub inclosing said cones, balls provided between said hub and said cones, a drill-disk mounted on said hub, and means for covering said hub and cones.

8. The combination, with a drill-boot spout having fixed cones, of movable cones having threaded shanks projecting through openings in said fixed cones and provided with lock-nuts at their inner ends, hubs inclosing said cones and having ball-runways, balls provided between said hubs and said cones, and drill-disks mounted on said hubs.

9. The combination, with a drill-boot spout provided with a chamber having fixed cones in its side walls, of movable cones having shanks projecting into said chamber and adjustable toward or from said fixed cones, hubs inclosing said cones, balls provided between said hubs and said cones, and drill-disks mounted on said hubs.

10. The combination, with a drill-boot spout having a chamber provided with an open lower end and having fixed cones in its side walls, of movable cones having threaded shanks projecting through threaded openings in said fixed cones and provided with lock-nuts at their inner ends within said chamber and with squared outer ends, flanged hubs inclosing said cones, balls provided between said cones and hubs, and drill-disks carried by said hubs.

11. The combination, with a drill-boot, of fixed and movable cones supported thereon, a hub having a ball-bearing on said cones and provided with a radial flange, a drill-disk fitting an annular recess in said flange and bearing upon a shoulder formed by said recess, and means securing said flange, and said disk together.

In witness whereof I have hereunto set my hand this 16th day of January, 1904.

OCTAVE A. POIRIER.

In presence of—
RICHARD PAUL,
M. HAGERTY.